Nov. 4, 1958   R. F. ENSIGN   2,858,845
PRESSURE REGULATOR AND HEATER
Filed June 27, 1955   4 Sheets-Sheet 1
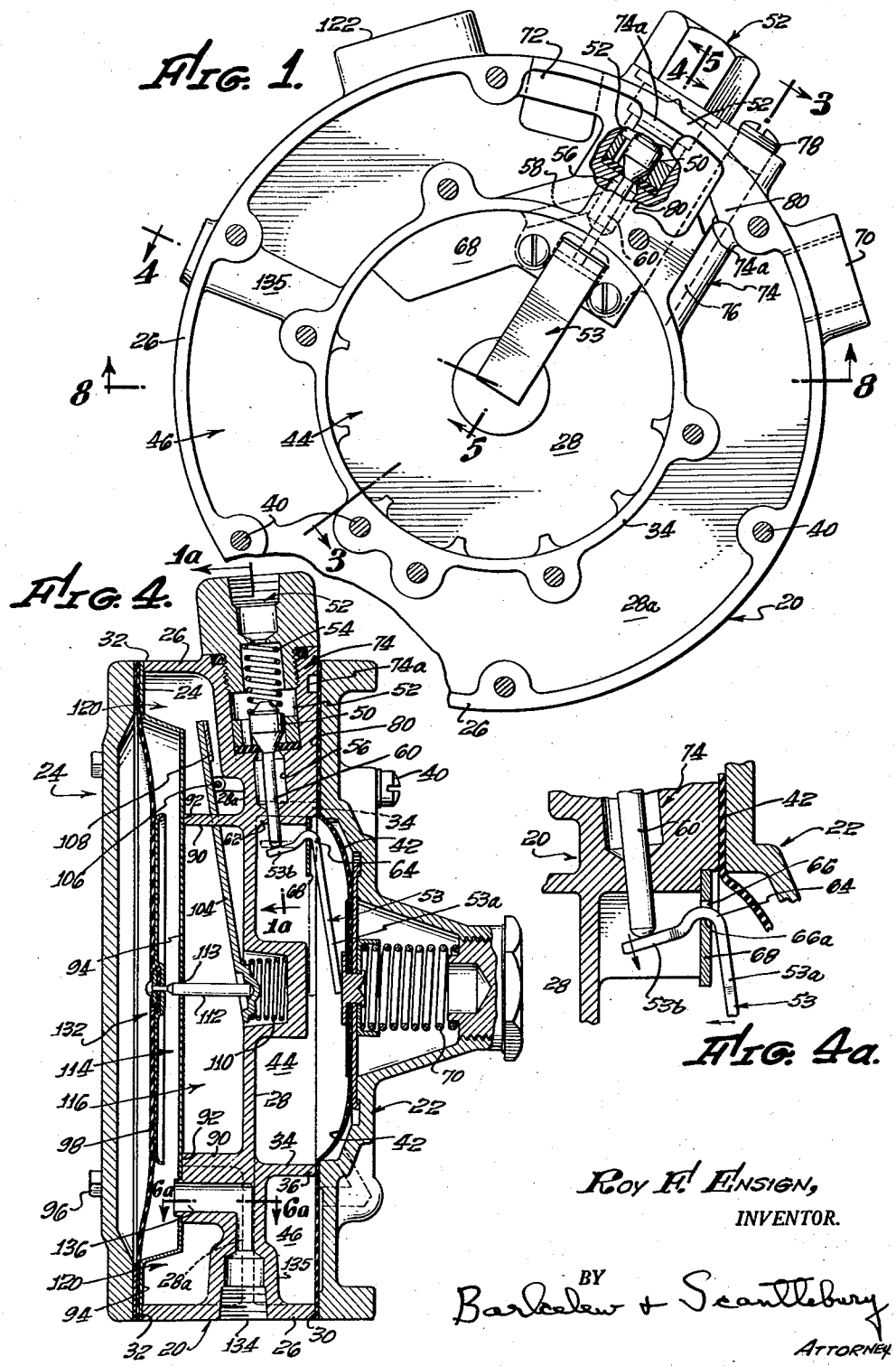
Roy F. Ensign,
INVENTOR.
BY Barlcelew + Scantlebury
ATTORNEY

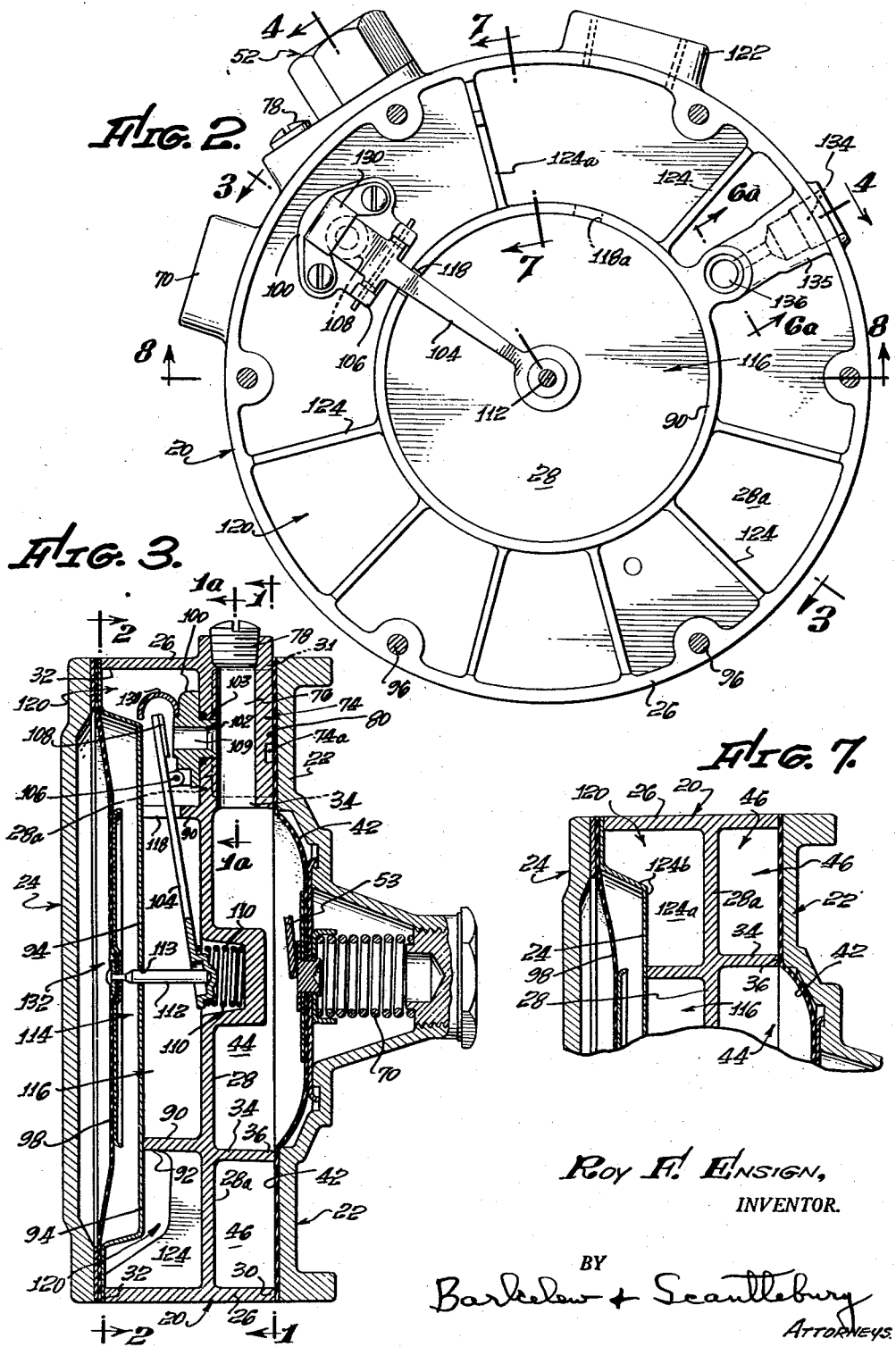

Nov. 4, 1958  R. F. ENSIGN  2,858,845
PRESSURE REGULATOR AND HEATER
Filed June 27. 1955  4 Sheets-Sheet 3
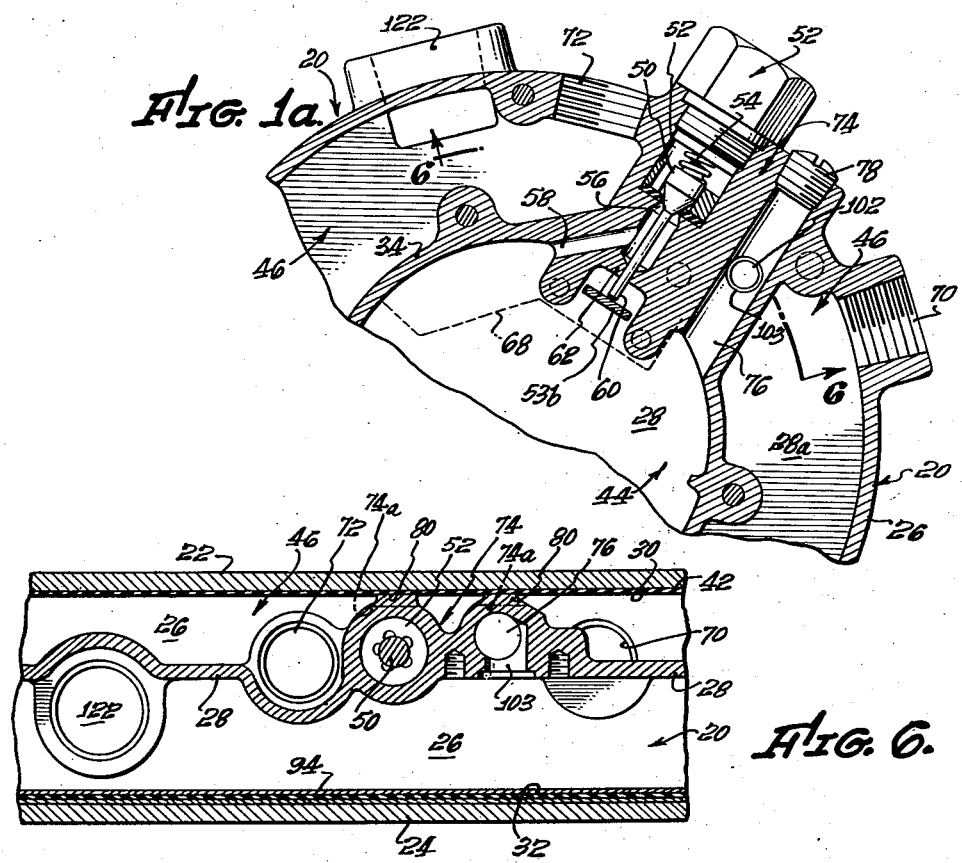
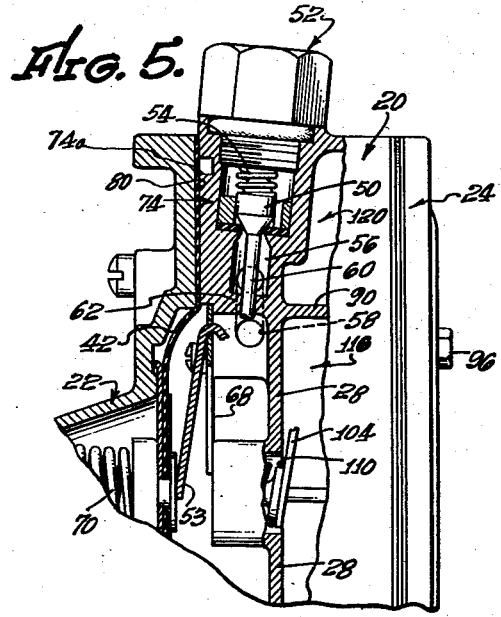
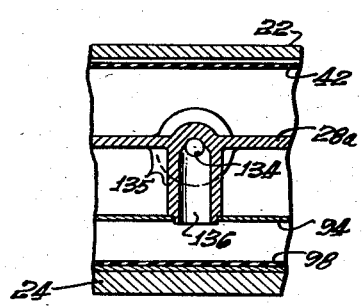
Roy F. Ensign,
INVENTOR.
BY Barkelew & Scantlebury
ATTORNEYS

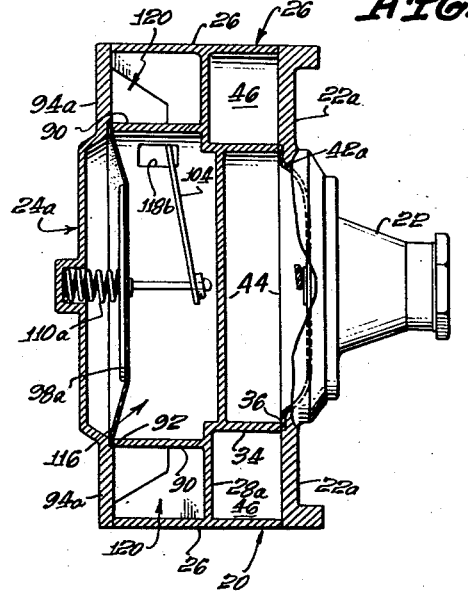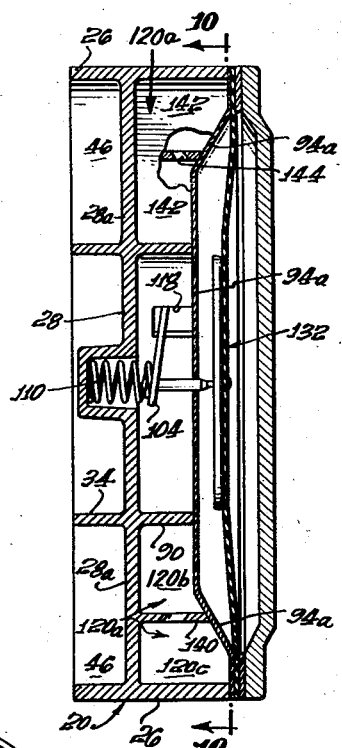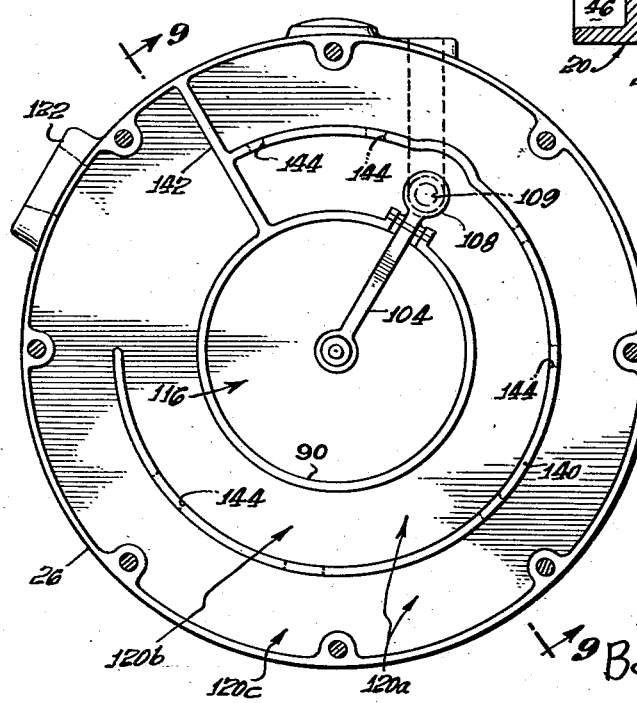

United States Patent Office 2,858,845
Patented Nov. 4, 1958

2,858,845

PRESSURE REGULATOR AND HEATER

Roy F. Ensign, San Marino, Calif., assignor to Ensign Carburetor Company, Los Angeles, Calif., a corporation of California Application June 27, 1955, Serial No. 518,258

18 Claims. (Cl. 137—340)

This invention has to do with pressure regulators of the type wherein the regulated fluid, on expansion from higher to lower pressures, is heated. Although the invention is not limited to the pressure regulation and heating of fuels and may be used for the regulation and heating of any fluid, its typical use at present is for vaporizing and expanding such liquid fuels as butane from the liquid phase at high pressure to the gaseous phase at low pressure, and heating the fuel to vaporize it.

The primary objective is the provision of a regulator of simple formation—more specifically, one whose body and other parts can be formed of cast metal without the necessity of coring out any cavities—and in which the expanding fluid is effectively heated to be delivered in warmed gaseous form. As applied, for example, to butane, it is necessary to transfer sufficient heat to the fluid to vaporize it; and it is specifically an objective to provide a regulator and heater of the indicated simple formation that will do that.

Other objectives and corresponding accomplishments will appear from the following description of a typical and illustrative embodiment of the invention; such embodiment being illustrated in the accompanying drawings, in which:

Fig. 1 is a sectional elevation taken as indicated by line 1—1 on Fig. 3, being in essence an elevation of the regulator as it appears at the first stage side with the first stage cover and diaphragm removed;

Fig. 1a is a fragmentary section on lines 1a—1a of Figs. 3 and 4;

Fig. 2 is a sectional elevation of the opposite or second stage side, taken as indicated by line 2—2 on Fig. 3;

Fig. 3 is a section of the complete regulator, taken as indicated by lines 3—3 on Figs. 1 and 2;

Fig. 4 is a similar section taken as indicated by lines 4—4 on Figs. 1 and 2;

Fig. 4a is an enlarged detail of Fig. 4;

Fig. 5 is a detail section taken as indicated by line 5—5 on Fig. 1 with certain parts broken away for clarity of illustration;

Fig. 6 is a detail section on line 6—6 of Fig. 1a, omitting certain parts;

Fig. 6a is a detail section on line 6a—6a of Fig. 4;

Fig. 7 is a detail section on line 7—7 of Fig. 2;

Fig. 8 is a section taken on line 8—8 of Figs. 1 and 2, but illustrating certain modifications;

Fig. 9 is a section on line 9—9 of Fig. 10 illustrating another modification; and Fig. 10 is an elevational section taken as on line 10—10 of Fig. 9.

The casing of the regulator consists essentially of a central body 20 and two cover plates 22 and 24. The central body 20 has an external peripheral wall 26 preferably circular in form and preferably of an axial length about as shown in proportion to its diameter. The drawings (Figs. 1 to 7) show an actual regulator in full size and preferred dimensional proportions. A transverse division wall 28, integral with external wall 26, extends across the interior of that wall intermediate its opposite annular outer edges, preferably somewhat closer to the right hand (as seen in Figs. 3 and 4) edge 30 than to the left hand edge 32. An annular wall 34, integral with wall 28 and spaced inwardly of external wall 26, projects from division wall 28 to the right (as seen in Figs. 3 and 4) and has its outer edge 36 preferably coplanar with the edge 30 of the outer wall. Cover plate 22 is held against wall edges 30 and 36 by the cap-screws indicated at 40, and, with the first stage diaphragm 42 which is clamped between the cover plate and the body, closes the first stage chamber 44 inside wall 34 and the annular heating medium (hot water) chamber 46 between the two walls 26 and 34. The outer edge of diaphragm 42 could be clamped under cover 22 only against inner wall 34; but preferably extends further outward to be clamped also against outer wall 26. That outer part of the diaphragm may be functionally regarded as a part of the outer part of cover plate 22 that closes the otherwise open end of annular chamber 46. Diaphragm 42 forms the actual closure for the otherwise open end of the central chamber 44; the part of cover plate 22 that lies over that central chamber functions not as a closure but as a protective covering and as a mounting means for reference spring 70.

A first stage valve 50 controls the initial high pressure inlet 52, operated through lever 53 by diaphragm 42. The type of valve shown here is the subject matter of my application, Serial No. 430,183, filed May 17, 1954, and is not of itself here claimed. Insofar as this present application is concerned the valve itself is merely illustrative of any suitable first stage valve. As shown, it opens outwardly against the pressure of a closing spring 54 to admit fluid to the inlet passage 56, 58 (see Fig. 1a). Valve stem 60 extends inwardly from the valve and projects through and beyond the wall 62 which forms the end of passage 56 where passage 58 branches off from it. (The purpose of this arrangement of the inlet passage will be explained later.) Valve operating lever 53 is in bell crank form with its long arm 53a engaging the inner face of diaphragm 42 and its short arm 53b engaging the inner end of valve stem 60. At the junction of the two arms (see more particularly Fig. 4a) it has an approximately 180° crook formation 64 which, passing through a slot 66 in a plate 68, forms the pivot structure for the lever. Pressures on the two lever arms being in the directions indicated by the arrows in Fig. 4a, the lever crook is pressed against the slot edge 66a which thus becomes the real pivotal support of the lever. The fact that this edge is the edge of a slot through which the lever crook passes fairly snugly prevents the lever from being accidentally displaced from its pivot. Plate 68 has additional functions, explained later.

Cover plate 22 encloses the reference pressure means for diaphragm 42, shown here as the conventional reference pressure spring 70 whose strength, relative to the effective area of the diaphragm, determines the fluid pressure that will be maintained in first stage chamber 44.

The final branch 58 of the inlet passage angles off from 56 and extends substantially tangentially of wall 34 (see particularly Fig. 1a) so that the expanding cold fluid is initially delivered tangentially against or close to wall 34 which forms the inner wall of the heat medium chamber 46. This tangential delivery sets up a circular flow of the fluid around the inside of wall 34, preventing short circuit flow from the inlet to the outlet 76; the latter being positioned so that the fluid must travel substantially around the complete, or a major portion of the, circuit to reach the outlet. This initial inlet delivery is also behind the plate 68 (see Figs. 1a and 5) which extends for some distance in the delivery direction. The plate thus keeps the initial cold delivery away from diaphragm 42 and against division wall 28. By these means the initial cold inlet delivery is rapidly heated and prevented from coming into contact with parts that are not immediately heated from the heating chamber. Wall 34 is directly highly heated from chamber 46; and the parts of division wall 28 adjacent wall 34 are immediately highly heated from 46 and 34.

The annular heating medium (hot water) chamber 46 has an inlet at 70 and an outlet at 72 located at opposite sides of, and near to, the trans-chamber stop formed by a body of metal 74 (see Fig. 1a). That body of metal, extending across the annular water passage, forms the walls for the initial inlet passages 52, 56, 58, and for the radial passage 76 which communicates at its inner end with first stage chamber 44. This passage 76, forming part of the passage from the first stage to the second stage chamber, is bored through the casting from the outside, and its outer end closed by plug 78. The body of metal 74, cast integrally with walls 26, 28 and 34, has external surfaces 80 extending radially between walls 26 and 34 and co-planar with the edges 30 and 36 of those walls. (See Figs. 1 and 4.) The diaphragm 42—or cover plate 22—fitting against those edges, then also bears tightly against surfaces 80, perfecting the trans-chamber stop formed by the metal 74. The hot water entering at 70 thus must make substantially a complete circuit of annular chamber 46 to reach the outlet at 72.

As so far explained, the trans-chamber stop formed by the metal 74 is a complete stop. It is preferred, however, to provide a limited passage past or through that stop. Such a passage is illustrated in Figs. 1 and 6 by the grooves 74a sunk across the surfaces 80. The purposes and functions of that passage are two. With the regulator installed in its usual upright position, as in Figs. 1 and 4, that passage relieves any air lock that might otherwise occur. It also permits a certain proportion of the whole hot water flow to pass through or over the metal 74, serving to directly heat that metal and the fluids in inlet 52 etc. and in passage 76. Furthermore, and particularly if heat inlet 70 and outlet 72 are located somewhat further from stop metal 74 than here shown (as they are in some installations to provide more free spacing between the pipe fittings connected with 52, 70 and 72) such a passage as 74a sets up heating fluid flow through the parts of chamber 46 that lie between 70, 72 and the stop, thereby directly keeping up the temperatures of the wall portions adjacent those chamber parts. In that connection it may be mentioned that fluid flow through the stop also helps to keep up the temperatures of the wall portions adjacent the stop. The amount of such fluid flow past the stop, in proportion to the main flow around the major part of chamber 46, may be, for example, approximately the ratio of the distance directly between 70 and 72, to the distance between them measured around the length of chamber 46.

It will be noted that the direction of flow of the heating medium around the annular chamber 46 (clockwise in Fig. 3) is opposite to the circular flow of fluid in regulator chamber 44. This counter-flow of the two fluids at opposite sides of wall 34 leads to most effective heating of the fluid in 44. In this connection it will be noted that the heat medium inlet 70 is located near the fluid outlet 76; and that heat medium outlet 72 is located near fluid inlet 58.

An annular wall 90, spaced within outer wall 26, projects from the other side, the second stage side (left side as seen in Figs. 3 and 4—right as seen in Fig. 5) of division wall 28 to an outer annular edge at 92. Wall 90 is also integral with 28. A sub-division wall or plate 94, preferably dished as shown, bears snugly against wall edge 92 and has its outer periphery clamped—by the cap-screws indicated at 96—against edge 32 of wall 26, under the second stage diaphragm 98 and cover plate 24. In this form of the regulator, wall 94 forms the direct, but apertured, cover for the otherwise open end of the annular chamber 120 lying between walls 26 and 90.

An apertured valve seat member 100 (see Fig. 3) is set on wall 28, its apertured extension 102 reaching through an opening 103 in that wall to communicate with passage 76. A valve lever 104 is pivoted at 106 and carries at one end a valve disk 108 to close down on the valve seat. The pressure at which the second stage delivers depends, as in any regulator, on the reference pressures applied to its diaphragm or valve system; and insofar as this present invention is concerned that delivery pressure may be as desired for various uses. This particular embodiment of the invention has however been designed for delivery at a slightly sub-atmospheric pressure. Consequently, the other end of lever 104 is pressed in a valve closing direction by reference spring 110 whose strength, with relation to the effective area of diaphragm 98, determines the sub-atmospheric pressure at which valve 108 will open. A push pin 112 extends between the diaphragm and valve lever to push the lever in valve opening direction when the diaphragm moves inwardly into the sub-chamber 114 formed between the diaphragm and the sub-division wall 94. Pin 112 passes loosely through that wall, the loose fit providing the desired restricted communication between sub-chamber 114 and chamber 116 within wall 90. Lever 104 extends through a slot 118 in wall 90, the slot affording a convenient localized communication between chamber 116 and annular chamber 120 which lies between wall 90 and outside wall 26. Preferably there is also a localized opening 118a through wall 90 directly opposite final outlet 122 so that the pressure at the final outlet is communicated to chamber 116 and, via restricted opening 113, to the sub-chamber 114.

Valve 108 is located in annular chamber 120. The final low pressure outlet from the regulator leads from chamber 120 at any suitable location around its periphery, preferably fairly close to the valve, as at 122. Radial baffle ribs 124 extend across the annular chamber, cast integrally with walls 26, 28 and 90 to increase heat conduction to, and cause turbulent flow of, the vapors in that chamber. All these ribs except the one designated 124a are shaped, typically, as shown in Fig. 3 to only partially close off flow through the chamber. The single rib 124a, located between valve 108 and outlet 122 (see Figs. 2 and 7), is formed to quite completely form a stop across the chamber at that point, to force the vapors to flow around substantially the complete circuit of the chamber between the valve and the final outlet. See Fig. 7, which shows how the outer edge 124b of 124a is shaped to contact sub-division wall 94 to form a complete stop across annular chamber 120.

A shield piece 130 (see Figs. 2 and 3) extends over valve 108 and between it and outer wall 26, preventing the expanding cold vapor stream which sprays out under valve 108 from immediately striking the outer wall in a concentrated area. This prevents that area from becoming unduly cold and causing external frost formation on the wall.

The pressure controlling operation of the second stage of the regulator needs no extended description. It is substantially the same as in my Patent No. 2,248,222. For feeding fuel to the carburetor of an internal combustion engine, spring 110 is preferably set to cause the second stage to deliver normally at a slightly subatmospheric pressure. Cover plate 24 forms a reference chamber which may either be open to atmosphere, or connected via a balance tube with the carburetor air intake. Figs. 2 and 4 show at 134, 136 a passage communicating with the sub-chamber 114 for the purpose of modifying the pressure in that chamber to change the delivery pressure. Such operations of the second stage diaphragm are the subject matters of previous applications and patents and are not directly involved in the present invention. The small body of metal 135 in which passages 134, 136 are contained is integrally related to walls 22, 28, 34 and 90 in the manner shown in Figs. 1, 2, 4 and 6a.

In the preferred form of the invention so far described, division wall 94 performs the function of a cover plate for annular chamber 120. Diaphragm 98 forms the effective closure for the central chamber 116 and is subjected to the pressure in that chamber via the opening 113 in wall 94. If that pressure is modified by modification of the pressure in 114, the diaphragm is still fundamentally subjected to the pressure in 116. If the modification functions of 114 are not used, then central chamber 116 may be wide open to 114, plate 94 then becoming in effect merely a cover for annular chamber 120, confining the second stage flow to that annular chamber. And in that case, diaphragm 98 would be exposed solely to the pressure existent in central chamber 116 and would form a direct closure for the otherwise open end of that chamber. In the form illustrated in e. g. Fig. 4, diaphragm 98 forms the ultimate closure for chamber 116, and is exposed to the pressure in that chamber via the restricted opening 113.

The observations of the immediately foregoing paragraph, and other modifications of detail, are illustrated in Fig. 8. For purposes of simplicity of illustration, the section of that figure is taken on line 8—8 of Fig. 1, so that it does not show the valve structures etc. Other than the parts now to be particularly referred to, the complete structure is the same as shown in the other figures, and corresponding parts are given the same numerals. One modification of detail has to do with cover plate 22 and diaphragm 42. As here shown, the outer edge of diaphragm 42a is clamped only against outer edge 36 of wall 34. The outer part 22a of cover 22 then directly forms the closure for annular chamber 46.

Other modifications shown in Fig. 8 are as follows. Cover plate 94a for outer annular chamber 120 may be conveniently formed by the outer part of cover 24a. That cover plate 94a rests on the outer edge 32 of outer peripheral wall 26. It also clamps the outer edge of diaphragm 98a against the outer edge 92 of inner wall 90, so that the diaphragm directly forms the closure for chamber 116. Slot 118 of the other figures becomes here the hole 118b, to give the diaphragm continuous bearing around edge 92. The form of the other figures is preferred where the regulator is to finally deliver at low or sub-atmospheric pressures, or where it is desirable to slightly modify the delivery pressure; in which cases a large second stage diaphragm is desirable. But for delivery at higher pressures, the simple form of Fig. 8 may be used; and instead of the spring 110 of the other figures, a reference spring 110A may be placed as shown.

As mentioned before, the hot water or other heating medium in annular chamber 46 directly heats both the wall 34, that completely surrounds the first stage chamber 44, and the outer annular part 28a of division wall 28. The relation of chamber 46 to those walls can best be seen in Figs. 3 and 7. Outer annular part 28a of wall 28 need not be in the same plane as 28, but may be offset from that plane. See e. g. Fig. 8. By immediate conduction from 34 and 28a the central part of wall 28 is also heated. Incidentally, the outer annular part of cover plate 22 is also heated, and that, by conduction and radiation of heat from the cover plate through diaphragm 42, has some effect, although minor, in heating and vaporizing the fluid in first stage chamber 44. The fluids in the first stage are heated and vaporized mainly from the directly heated wall 34, and also from the conductively heated wall 28. The tangential initial delivery of the cold expanding fluid at inlet passage 58 tends to set up a circular movement of the cold fluid around the periphery of chamber 44 in immediate contact with the hot wall 34, thereby increasing the rate of heat transfer to the fluids. The initial tangential delivery is in a direction away from passage 76 that forms the outlet from the first stage chamber (see Figs. 1 and 1a) and thus tends to prevent short-circuited flow directly from 58 to 76.

Passing into the second stage under control of valve 108, the fluids in their second expansion are delivered directly into the annular chamber 120 of which the directly heated wall 28a forms one wall. The other two walls 26 and 90, of that annular chamber are heated by direct conduction from wall 28a. Wall 90 is preferably substantially opposite the wall 34; so that the whole of annular chamber 120 is directly heated from wall 28a. Although preferable, it is not necessary that wall 90 be substantially directly opposite wall 34. In that preferred arrangement chamber 120 is substantially wholly opposite heating chamber 46. But a location of wall 90 either inwardly or outwardly of the location illustrated (see e. g. Fig. 8) would still position the two chambers at least in part opposite each other, and chamber 90 would still effectively receive heat from 46 directly through wall 28a.

No continuous flow takes place through sub-chamber 114. A small amount of continuous flow takes place through chamber 116, through openings 118 and 118a in wall 90. But the continuous flow of fluids through the second stage is largely restricted to the annular chamber 120, in direct contact with the most highly heated walls; and, as before explained, the fluids must travel the whole circuit of that chamber before final delivery. The result is that a fluid such as butane is heated sufficiently to be finally delivered in completely gaseous form after expansion from a liquid at high pressure down to a pressure that may even be sub-atmospheric.

And it is a particular feature of the present invention that the effective heating and gasification are accomplished in a regulator so designed that all its major parts, particularly the body 20 with its several walls, can be cast integrally without the necessity of any coring operations. Considering body 20 as a casting, it will be seen that it has in itself no enclosed chambers. The several passages, such as the inlets and outlets to the chambers, are bored in the body after casting. Essentially, the body casting is composed entirely of the medial division wall 28 and other walls and ribs—26, 34, 90, 124—and metal masses such as 74 and 135, which project openly from one side or the other of 28 and can be cast integrally with it without any coring. This results in a casting much less expensive than those of previous regulator bodies wherein, for effective heating, it has been thought necessary to form the heating chamber as a closed chamber surrounded by integrated walls, the heating chamber usually lying between the first and second stage fluid chambers.

Figs. 9 and 10 show another modification. The modifications here have only to do with the arrangement of the chambers at the second stage side of the division wall 28. To the left of division wall 28 in Fig. 9 the whole mechanism is or may be the same as at the first stage side of that division wall in all the other figures. Consequently, for simplicity of illustration in Fig. 9, only the body portions of the first stage side (left in that figure) are shown.

On the second stage side of division wall 28 in Figs. 9 and 10, the inner wall 90 surrounds the inner chamber 116 and separates that chamber from an outer annular chamber 120a which is divided into two annular chambers or passages 120b and 120c by an integral wall 140. As shown here, the whole of chamber 120a lies directly opposite heating chamber 46, walls 34 and 90 being opposite each other. A stop wall 142 extends across the whole width of chamber 120a in about the position shown relative to the second stage valve inlet to that chamber. That stop wall 142, cast integrally with walls 28, 26, and 90, completely stops off the chamber 120a between walls 26 and 90 and between wall 28 and the cover plate 94a. The second stage valve is the same as shown in Figs. 1–8, except that the shield 130 is not used. The valve controlled passage 109, the valve seat member 100, and the valve 108 are the same as in Figs. 2 and 3.

The valve controlled passage 109 communicates with the inner chamber-passage 120b, and the fluid, which may still be partially in the form of mist, is sprayed out under the valve 108 in all directions over division wall 28a and against walls 142, 140 and 90. Striking those walls it is immediately heated.

The general and major travel of the fluids through chamber 120a is through the inner chamber-passage 120b, in a clockwise direction in Fig. 10, around to the end of wall 140 and then to the final outlet 122. However, wall 140 is apertured as indicated at 144 so that chamber-passage 120c is in communication with 120b at various points around the circuit of flow. Wall 140 prevents the cold expanding fluid that issues from under the valve from directly striking outer wall 26; but apertures 144 allow a certain amount of flow through outer chamber-passage 120c, and that part of the flow picks up heat from wall 28a as well as from 140 and 26. Wall 140 functions as a shield like shield 130 of the other figures; and in addition acts as an additional heat conducting wall from the heating chamber to the fluids in both chamber passages 120b and 120c.

Partition 94a engages the edges of both walls 90 and 140 so as to form a cover plate for both the chamber passages 120b and 120c. The modifications spoken of in connection with Fig. 8 may be applied also to the form of Figs. 9 and 10.

Certain of the features of the invention are applicable to a single stage regulator. A typical form of such a regulator may readily be visualized by simply supposing all parts in e. g. Fig. 3 to the left of division wall 28 to be removed, and that the passage 76 is the final delivery passage of the single stage—the first stage of the drawings. The body of such a single stage regulator will then typically comprise the central regulator chamber 44, and the surrounding heating chamber 46, with the valve controlled inlet passage 52 and outlet passage 76 contained in the metal mass 74 forming the transverse stop across heating chamber 46. In such a simplified single stage regulator division wall 28 becomes what may aptly be called a side wall for the chambers 44 and 46; and in the illustrated two-stage regulator wall 28 may also aptly be called a common side wall between the chambers of the two stages. Also the annular chamber 120 may operate as a heating chamber for the fluids without operating as an element of the second stage of a regulator. This may be visualized in either Figs. 3 and 4 or Fig. 8 by supposing the second stage valve 108 to be omitted. The fluid pressure in annular chamber 120 would then be the same as in first stage chamber 44—the regulator would be a single stage regulator—but the fluids would be heated, as before explained, in both the chamber 44 and the chamber 120.

I claim:

1. In a pressure regulator and heater of the character described, the combination of a body of integrally cast metal comprising an outer peripheral wall having end edges in spaced planes, a medial division wall integral with the peripheral wall extending across the interior of the peripheral wall in a medial plane, inner walls directly integrated with and projecting from opposite faces of the division wall and peripherally enclosing central chambers at opposite sides of said division wall, each inner wall being annularly spaced from the outer peripheral wall to form annular chambers therebetween, all the body chambers thus formed within the inner walls and between those walls and the outer peripheral wall being open at their ends opposite the division wall, and the two annular chambers being at least in part located directly opposite each other at opposite sides of the division wall; cover plate means closing the otherwise open end of the annular chamber at one side of the division wall, a diaphragm forming a closure for the otherwise open end of the central chamber at that side of the division wall, a fluid inlet passage leading into the central chamber at that side of the division wall, valve means operated by the diaphragm to control said fluid inlet, means for introducing a heating medium to the annular chamber at said side of the division wall; closure means for the otherwise open ends of the annular and central body chambers at the opposite side of the division wall, said closure means including a second regulator diaphragm exposed to pressure existent in said central chamber, localized communication between the second mentioned annular and central chambers; an outlet passage leading from the first mentioned central chamber and delivering into the second mentioned annular chamber, a valve controlling said delivery and operated by said second diaphragm, and an outlet leading from the second mentioned annular chamber.

2. The combination defined in claim 1 and in which the localized communication between the second mentioned annular and central chambers includes an opening through the second mentioned inner wall located near the outlet which leads from the second mentioned annular chamber.

3. The combination defined in claim 1, and also including a shield located between the outer peripheral wall and the valve controlled delivery into the second mentioned annular chamber to prevent that delivery from directly striking the outer wall.

4. The combination defined in claim 1 and in which the cover plate means for the second mentioned annular chamber also extends over the end of the second mentioned central chamber.

5. The combination defined in claim 1, and also including an intermediate wall integral with and projecting from the division wall into the second mentioned annular chamber, said intermediate wall being annularly spaced from the outer wall and the inner wall and dividing said second mentioned annular chamber into inner and outer chamber-passages, and said valve controlled outlet passage from the first mentioned central chamber delivering into the inner one of said chamber-passages.

6. The combination defined in claim 5, and including also limited communication passages through said intermediate wall to limitedly intercommunicate the two chamber-passages.

7. An integrally cast body for a regulator and heater of the character described, said body comprising an outer peripheral wall having end edges in spaced planes, a medial division wall integral with the peripheral wall extending across the interior of the peripheral wall in a medial plane, inner walls directly integrated with and projecting from opposite faces of the division wall and peripherally enclosing central chambers at opposite sides of said division wall, each inner wall being annularly spaced from the outer peripheral wall to form annular chambers therebetween, all the body chambers thus formed within the inner walls and between those walls and the outer peripheral wall being open at their ends opposite the division wall, and the two annular chambers being at least in part directly opposite each other at opposite sides of the division wall.

8. In a pressure regulator and heater of the character described, the combination of a body of integrally cast metal comprising a side wall, a peripheral external wall integral with and projecting from a face of the side wall, an inner wall directly integrated with and projecting from the same face of the side wall and annularly spaced inwardly from the peripheral wall to form an annular heating chamber therebetween, said inner wall peripherally entirely enclosing a central regulator chamber, both said body chambers being open at the side of the body opposite the side wall; cover plate means sealingly closing the otherwise open end of the annular chamber, a diaphragm forming a closure for the otherwise open end of the central chamber, a fluid inlet passage for the regulator chamber, valve means operated by the diaphragm to control the fluid inlet, an outlet for the regulator chamber, and means for introducing a heating medium to the annular heating chamber, the valve controlled fluid inlet passage being formed in a body of cast metal integral with the several said walls and extending across the annular heating chamber to form a stop across that chamber, and the means for introducing a heating medium comprising a fluid inlet and a fluid outlet located near to and at opposite sides of said stop.

9. The combination defined in claim 8 and including also a passage through said stop to allow restricted circulation of heating fluid past said stop.

10. In a pressure regulator and heater of the character described, the combination of a body of integrally cast metal comprising a side wall, a peripheral external wall integral with and projecting from a face of the side wall, an inner wall directly integrated with and projecting from the same face of the side wall and annularly spaced inwardly from the peripheral wall to form an annular heating chamber therebetween, said inner wall peripherally entirely enclosing a central regulator chamber, both said body chambers being open at the side of the body opposite the side wall; cover plate means sealingly closing the otherwise open end of the annular chamber, a diaphragm forming a closure for the otherwise open end of the central chamber, a fluid inlet passage for the regulator chamber, valve means operated by the diaphragm to control the fluid inlet, an outlet for the regulator chamber, and means for introducing a heating medium to the annular heating chamber, the fluid inlet passage to the regulator chamber being located close to and directed to deliver tangentially of the inner wall.

11. The combination defined in claim 10, and in which the fluid outlet is located at said inner wall spaced from the fluid inlet in the direction of its delivery by substantially the complete circuit of said wall, whereby fluid flow is set up in said chamber circumferentially in said direction.

12. The combination defined in claim 11, including also a stop extending across the annular heating chamber, and in which the means for introducing a heating medium comprises a heating fluid inlet and a heating fluid outlet located at opposite sides of said stop and relatively located to set up flow of heating medium around said annular chamber in a direction opposite to that of the tangential fluid delivery to the regulator chamber.

13. The combination defined in claim 12, and in which the heating fluid inlet and outlet are located, respectively, near to the fluid outlet and inlet of the regulating chamber.

14. In a pressure regulator and heater of the character described, the combination of a body of integrally cast metal comprising a side wall, a peripheral external wall integral with and projecting from a face of the side wall, an inner wall directly integrated with and projecting from the same face of the side wall and annularly spaced inwardly from the peripheral wall to form an annular heating chamber therebetween, said inner wall peripherally entirely enclosing a central regulator chamber, both said body chambers being open at the side of the body opposite the side wall; cover plate means sealingly closing the otherwise open end of the annular chamber, a diaphragm forming a closure for the otherwise open end of the central chamber, a fluid inlet passage for the regulator chamber, valve means operated by the diaphragm to control the fluid inlet, an outlet for the regulator chamber, and means for introducing a heating medium to the annular heating chamber, the fluid inlet passage to the regulator chamber being located close to and directed to deliver tangentially of the inner wall, and there being a shield member overlying the fluid inlet delivery to confine that delivery close to the side wall, said shield member located between the fluid inlet delivery and the diaphragm.

15. The combination defined in claim 1 and also including a sub-division wall located between the second mentioned central chamber and the second regulator diaphragm, said sub-division wall having a restricted opening whereby the pressure in the second mentioned central chamber is applied to the second diaphragm.

16. In a pressure regulator and heater of the character described, the combination of a body of integrally cast metal comprising a side wall, a peripheral external wall integral with and projecting from a face of the side wall, an inner wall directly integrated with and projecting from the same face of the side wall and annularly spaced inwardly from the peripheral wall to form an annular heating chamber therebetween, said inner wall peripherally entirely enclosing a central regulator chamber, both said body chambers being open at the side of the body opposite the side wall; cover plate means sealingly closing the otherwise open end of the annular chamber, a diaphragm forming a closure for the otherwise open end of the central chamber, a fluid inlet passage for the regulator chamber, valve means operated by the diaphragm to control the fluid inlet, an outlet for the regulator chamber, means for introducing a heating medium to the annular heating chamber; a peripheral external wall integral with and projecting from the opposite face of the side wall, an inner wall directly integrated with and projecting from said opposite face of the side wall and annularly spaced inwardly from the external wall at said opposite face to form an annular chamber therebetween at said opposite face, said first mentioned and last mentioned annular chambers being at least in part located directly opposite each other at opposite sides of said side wall, cover plate means closing the otherwise open end of said last mentioned annular chamber, an outlet leading from said last mentioned annular chamber, and the outlet for the regulator chamber leading therefrom to said last mentioned annular chamber.

17. The combination defined in claim 16, and in which the valve controlled fluid inlet passage is formed in a body of cast metal integral with the several said walls and extending across the annular heating chamber to form a stop across that chamber, and in which the means for introducing a heating medium comprises a fluid inlet and a fluid outlet located near to and at opposite sides of said stop.

18. The combination defined in claim 17 and including also a passage through said stop to allow restricted circulation of heating fluid past said stop.

References Cited in the file of this patent

UNITED STATES PATENTS

| | | |
|---|---|---|
| 2,248,222 | Ensign | July 8, 1941 |
| 2,272,341 | Holzapfel | Feb. 10, 1942 |
| 2,475,087 | Ensign et al. | July 5, 1949 |
| 2,744,387 | Reed et al. | May 8, 1956 |